United States Patent
Mao et al.

(10) Patent No.: US 10,003,245 B2
(45) Date of Patent: Jun. 19, 2018

(54) LINEAR VIBRATING MOTOR

(71) Applicants: LuBin Mao, Shenzhen (CN); HongXing Wang, Shenzhen (CN); Fei Hou, Shenzhen (CN)

(72) Inventors: LuBin Mao, Shenzhen (CN); HongXing Wang, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 199 days.

(21) Appl. No.: 15/082,041

(22) Filed: Mar. 28, 2016

(65) Prior Publication Data

US 2017/0019010 A1   Jan. 19, 2017

(51) Int. Cl.
*H02K 33/00* (2006.01)
*H02K 5/24* (2006.01)
*H02N 2/00* (2006.01)
*H02K 33/16* (2006.01)

(52) U.S. Cl.
CPC .................................. *H02K 33/16* (2013.01)

(58) Field of Classification Search
CPC .............................. H02K 15/02; H02K 33/00
USPC .................... 310/17, 25, 36, 51, 81, 323.02
See application file for complete search history.

(56) References Cited

U.S. PATENT DOCUMENTS

2011/0193427 A1*   8/2011   Lemieux ................... F03G 7/08
                                                                310/25

* cited by examiner

*Primary Examiner* — Jose Gonzalez Quinone
(74) *Attorney, Agent, or Firm* — Na Xu; IPro, PLLC

(57) ABSTRACT

A linear vibrating motor is provided in the present disclosure. The linear vibrating motor includes a shell, a vibrating unit, a coil module and an elastic module. The shell provides a receiving cavity, the vibrating unit is received in the receiving cavity and includes a magnet module; the coil module surrounds the magnet module for driving the vibrating unit to vibrate; the elastic module includes a pair of elastic members for suspending the vibrating unit. Each of the elastic members comprises an elastic part for providing an elastic force to the vibrating unit in a vibrating direction thereof, and an elastic deforming capability of the elastic part in the vibration direction is greater than that in other directions.

9 Claims, 6 Drawing Sheets

LINEAR VIBRATING MOTOR

FIELD OF THE DISCLOSURE

The present disclosure generally relates to vibrator technologies, and more particularly, to a linear vibrating motor for providing vibration feedback.

BACKGROUND

Vibrating motors are widely used in mobile devices such as mobile phones, tablet computer, handheld game players, personal digital assistant, or the like, for providing vibration feedback. In operation, the vibrating motors transform electrical energy into mechanical energy based on electromagnetic induction.

Generally, the vibrating motors can be categorized into rotary vibrating motors and linear vibrating motors. The rotary vibrating motor generates vibration by driving an unbalanced rotor to rotate. The linear vibrating motor generates vibration by providing an electromagnetic force to drive a vibrator to perform linear mechanical vibration.

A related linear vibrating motor includes a magnet module and an elastic module. The elastic module is a pair of spiral springs, and the magnet module is suspended in the vibrating motor by the pair of spiral springs. The magnet module is driven to perform linear vibration when the vibrating motor is in operation.

However, in the linear vibrating motor, the spiral springs may deform in any direction, this may cause the magnet module to deviate from an appropriate vibration direction. As such, stability and reliability of the linear vibrating motor is low.

Therefore, it is desired to provide a linear vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
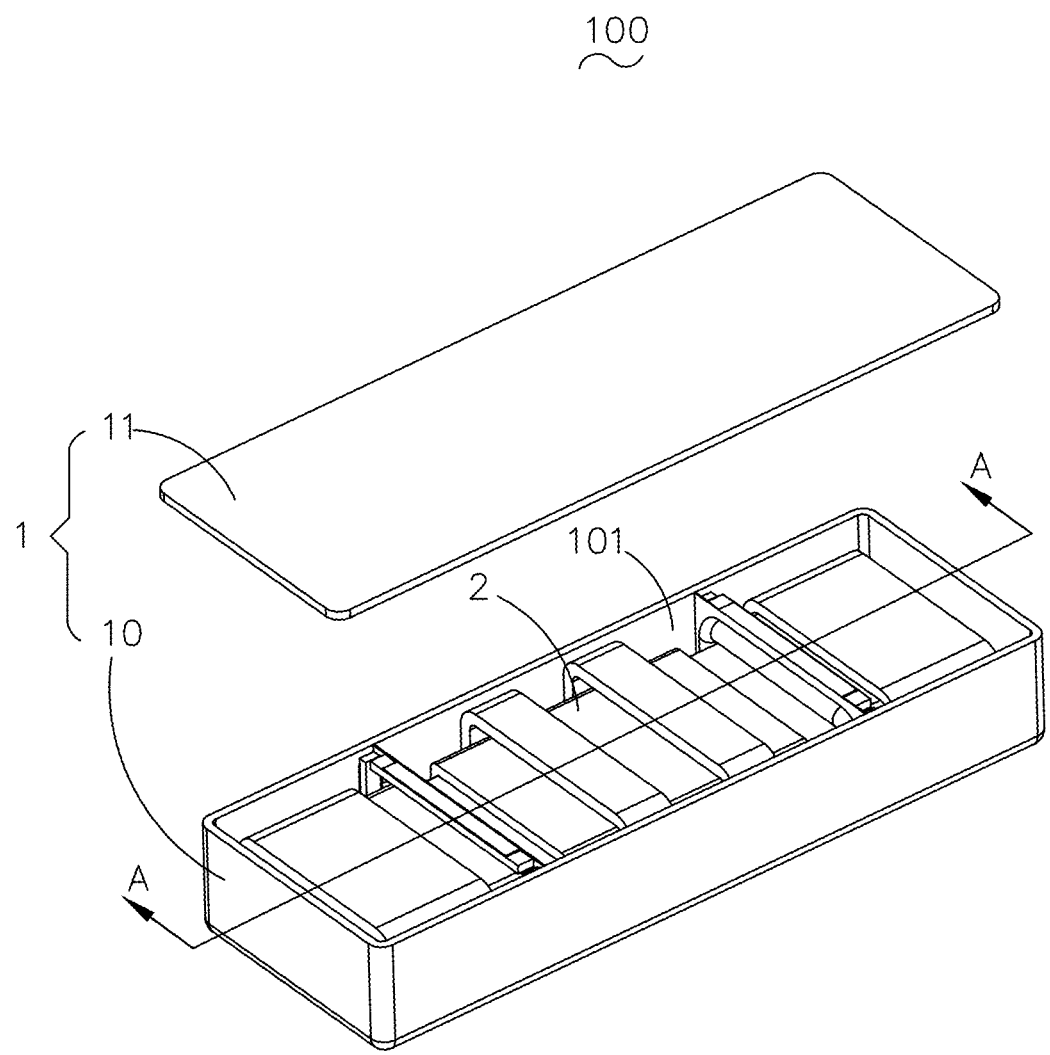
FIG. 1 is a schematic view of a linear vibrating motor according to an exemplary embodiment of the present disclosure.
Figure 2:
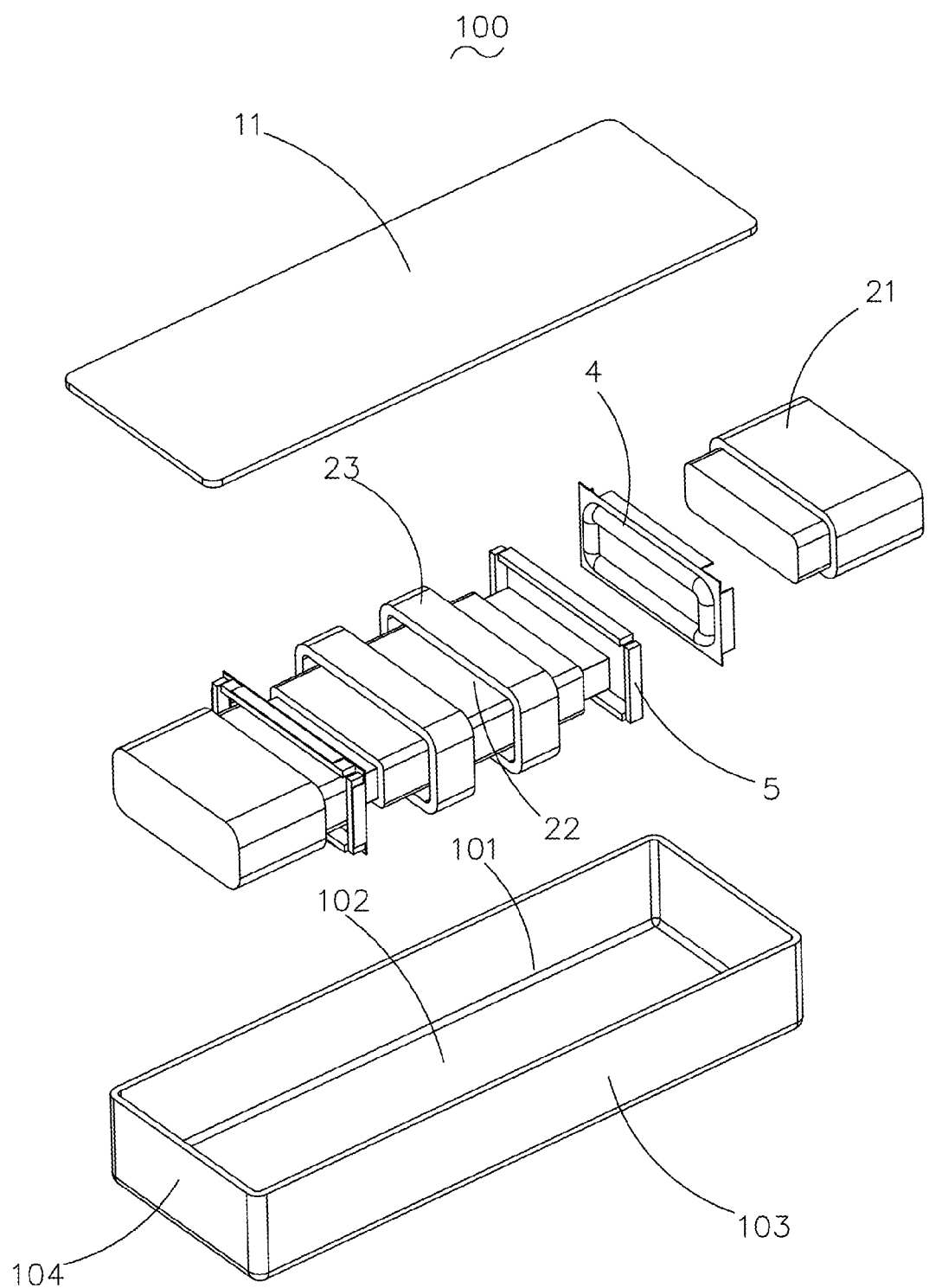
FIG. 2 is an exploded view of the linear vibrating motor in FIG. 1.
Figure 3:
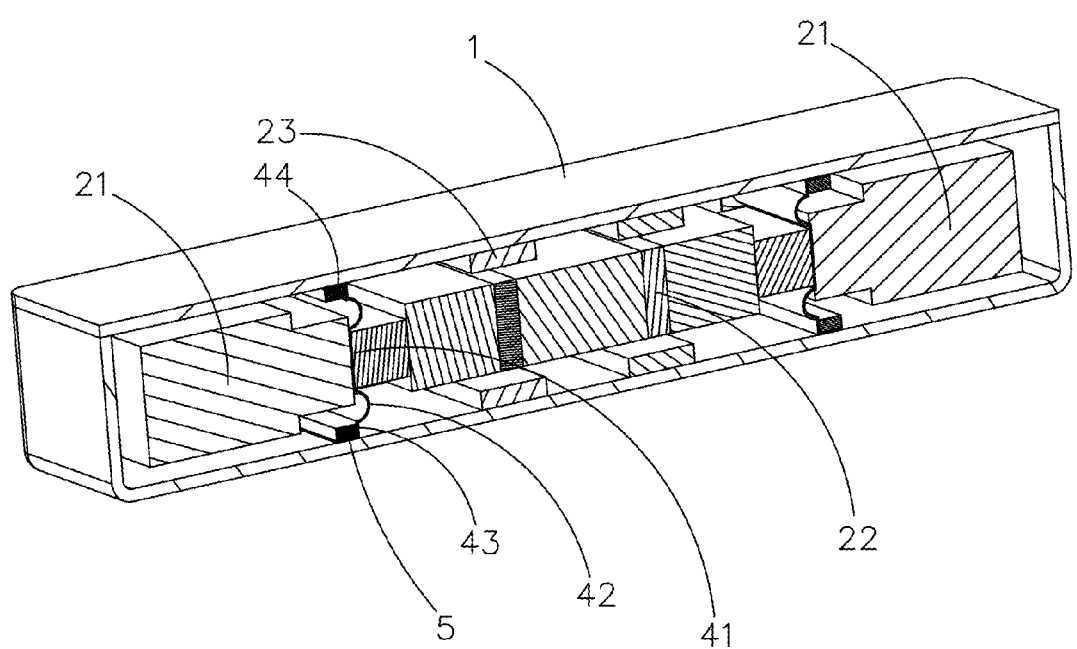
FIG. 3 is a cross-sectional view of the linear vibrating motor in FIG. 1, taken along a line A-A.
Figure 4:
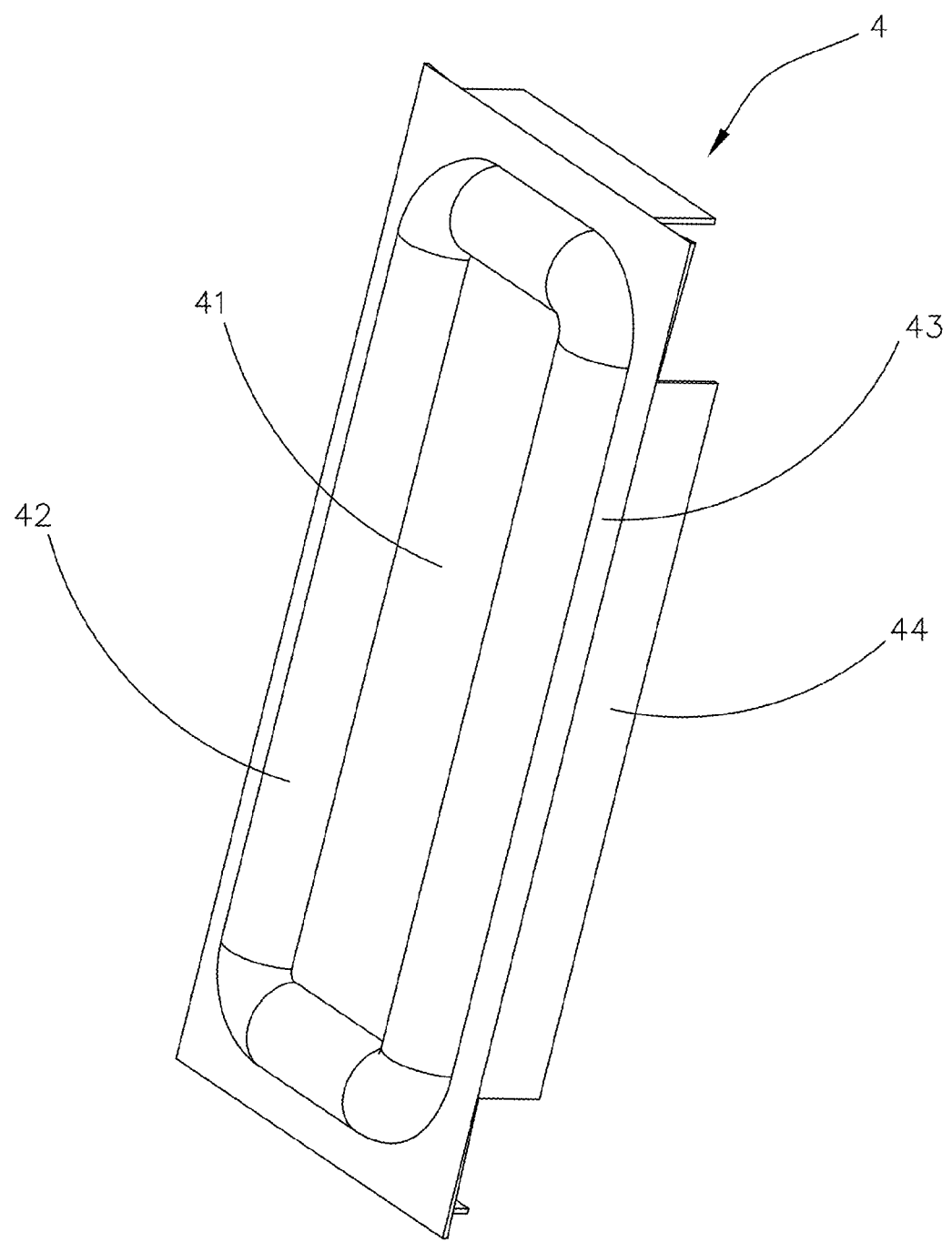
FIG. 4 is a schematic view of an elastic member of the linear vibrating motor in FIG. 1 in a first view angle.
Figure 5:
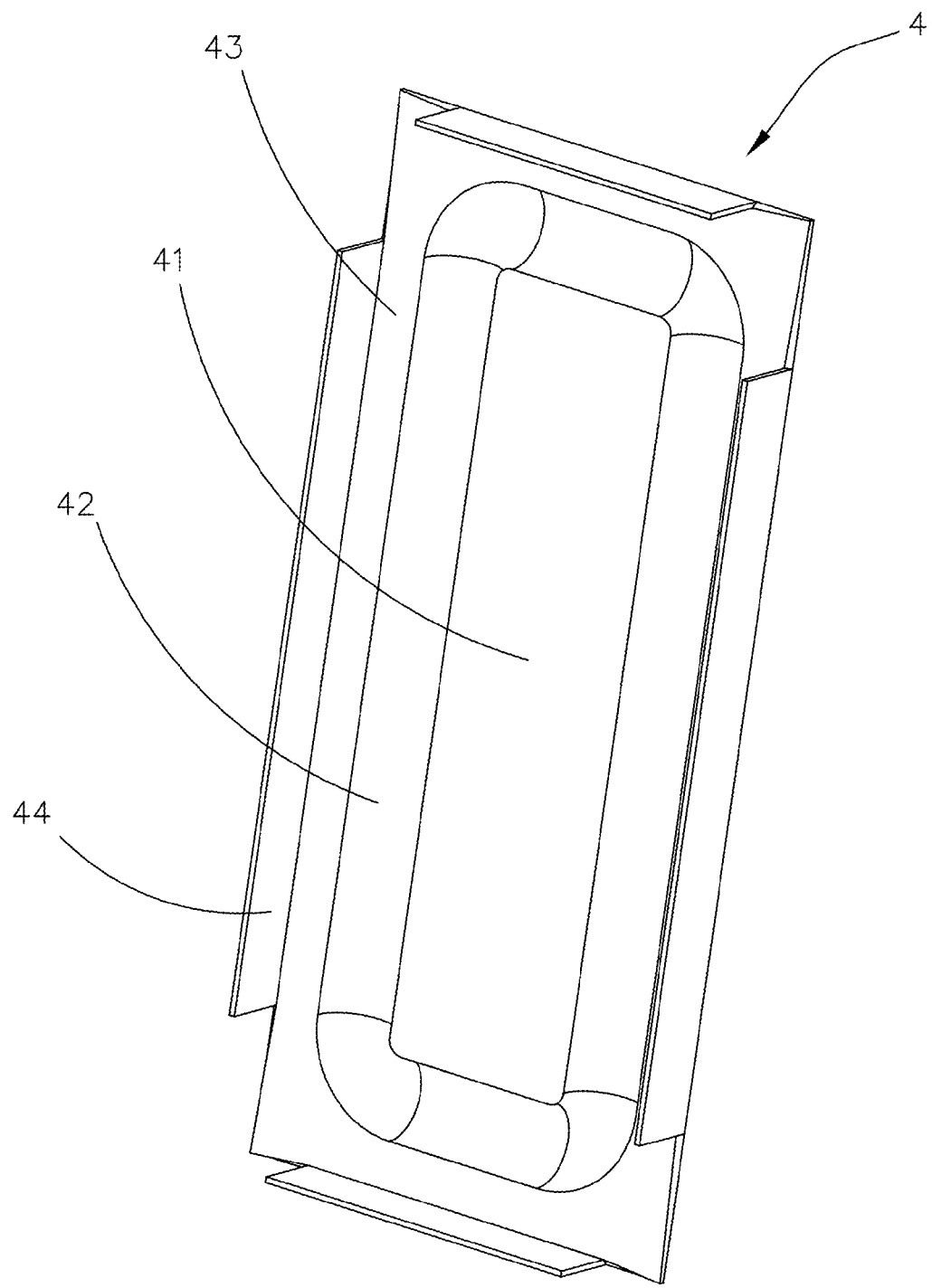
FIG. 5 is a schematic view of the elastic member in FIG. 4 in a second view angle.

Referring to FIGS. 1-3, a linear vibrating motor 100 according to an exemplary embodiment of the present disclosure is shown. The linear vibrating motor 100 includes a shell 1 providing a receiving cavity 101, a magnetic assembly 2 received in the receiving cavity 101, an elastic module 4 for suspending the magnetic assembly 2, and a connecting module 5 for connecting the elastic module 4 with the shell 1.

The shell 1 has a box-like structure, which includes a main housing 10 supporting the magnetic assembly 2 and a cover 11 covering the main housing 10 for forming the receiving cavity 101. The main housing 10 includes a rectangular bottom 102, a pair of first sidewalls 103 perpendicularly extending from two opposite long edges of the bottom 102 respectively, and a pair of second sidewalls 104 perpendicularly extending from two opposite short edges of the bottom 102 respectively.

The magnetic assembly 2 includes a mass module 21, a magnet module 22, and a coil module 23. The magnet module 22 is fixed to the mass module 21; the coil module 23 and the magnet module 22 cooperate to form a magnetic circuit in the shell 1.

In the present embodiment, the mass module 21 includes a pair of mass members, the magnet module 22 includes a permanent magnet, and the coil module 23 includes a pair of coils surrounding the permanent magnet and apart from each other. The magnet module 22 is located between the pair of mass members, and fixed to the pair of the mass members through the elastic module 4; the coil module 23 surrounds the magnet module 22 and is fixed to the shell 1.

The magnet module 22 may be magnetized along an axis direction thereof in a dual polarity manner. Because the coil module 23 surrounds the magnet module 22, a large magnetic flux can be obtained to ensure the linear vibrating motor 100 to produce a strong driving force for performing a strong vibration with a small driving current. Therefore, the linear vibrating motor 100 has low energy consumption, and has a long lifespan.

In the present embodiment, the mass module 21 and the magnet module 22 cooperatively serve as a vibrating unit in the linear vibrating motor 100. In other embodiments, the vibrating unit may only include the magnet module 22 or may further include other components capable of vibrating relative to the shell 1 in the linear vibrating motor 100 during operation.

Referring to FIGS. 2-5, in the present embodiment, the elastic module 4 includes a pair of elastic members, each of which can be made of a metal plate by either stamping process or drawing with ironing process. The pair of elastic members is respectively connected between the magnet module 22 and the pair of mass members of the mass module 21.

As illustrated in FIG. 2, each of the elastic members includes a rectangular main plate 41 located at a main central region thereof, an elastic part 42 surrounding the main plate 41, an extending periphery 43 extending outward from the elastic part 42 and a fixing part 44 perpendicular to the extending periphery 43.

The main plate 41 is located between a corresponding end of the magnetic module 22 and a corresponding mass member of the mass module 21. The elastic part 42 may be an elastic protrusion protruding from edges of the main plate 41 and surrounding the main plate 41; for example, the elastic protrusion may have a ring-shaped structure and is capable of performing elastic deformation. The extending periphery 43 extends from and surrounds the elastic part 42 and is coplanar with the main plate 41. The fixing part 44 may include four extending plates perpendicularly connected four edges of the extending periphery respectively and fixed to the shell 1. In present embodiment, the main plate 41, the elastic part 42, the extending periphery 43 and the fixing part 44 may be integrated into a one-piece structure.

In other embodiments, the extending periphery 43 may be an optional component, and thus may be omitted; the elastic part 42 may alternatively extend from a single edge, two opposite edges, or three edges of the main plate 41, and correspondingly, a configuration of the extending periphery 43 and/or the fixing part 44 may be adjusted in practice.

Furthermore, the elastic part 42 has a curved cross-section, that is, the elastic part 42 merely protrudes towards the magnet module 22; alternatively, the elastic part 42 may have a round cross-section, which protrudes towards both the magnet module 22 and the corresponding mass member. In other embodiments, a cross-section of the elastic part 42 may be V-shaped or zigzagged.

In the linear vibrating motor 100, the elastic part 42 may be driven to perform the elastic deformation to enable the vibrating unit to vibrate along the vibrating direction. Moreover, an elastic deforming capability of the elastic part 42 in the vibrating direction is much greater than that in other directions including a direction perpendicular to the vibrating direction, and this ensure the vibrating unit to perform a stable vibration along the vibrating direction.

Although the elastic module 4 is connected between the magnet module 22 and the mass module 21 in the present embodiment, in other embodiments, the magnet module 22 can alternatively be connected to the mass module 21 directly, and in this circumstance, each elastic member of the elastic module 4 is fixed to an end of a corresponding mass member of the mass module 21.

The connecting module 5 is configured for expanding a contact area between the elastic module 4 and the shell 1. In the present embodiment, the connecting module 5 includes a pair of the connecting members corresponding to the pair of elastic members respectively; each connecting member is surrounded by the fixing part 44 of the corresponding elastic member of the elastic module 4. Specifically, each of the connecting members includes four connecting bars separated from each other, the connecting bars are arranged in a rectangular manner on the extending periphery 43 and adjacent to the mass member; each of the connecting bars is located at a joint between an extending plate of the fixing part 44 and the extending periphery 43.

Furthermore, the shell 1, the mass module 21, the magnet module 22, the elastic module 4 and the connecting module 5 can be fixed by a welding approach, an adhering approach, or any other fixing approaches.

In operation, a current passes through the coil module 23, the coil module 23 interacts with the vibrating unit to drive the vibrating unit to vibrate along the vibrating direction. During operation of the linear vibrating motor 100, the elastic part 42 of the elastic module 4 provides the elastic force to drive the vibrating unit to vibrate along the vibrating direction, and the elastic part 42 can also restrict a motion of the vibrating unit in other directions. Therefore, the vibrating unit can be protected from suffering collision with the shell 1, and the stability and reliability of the linear vibrating motor 100 can be improved.

Figure 6:
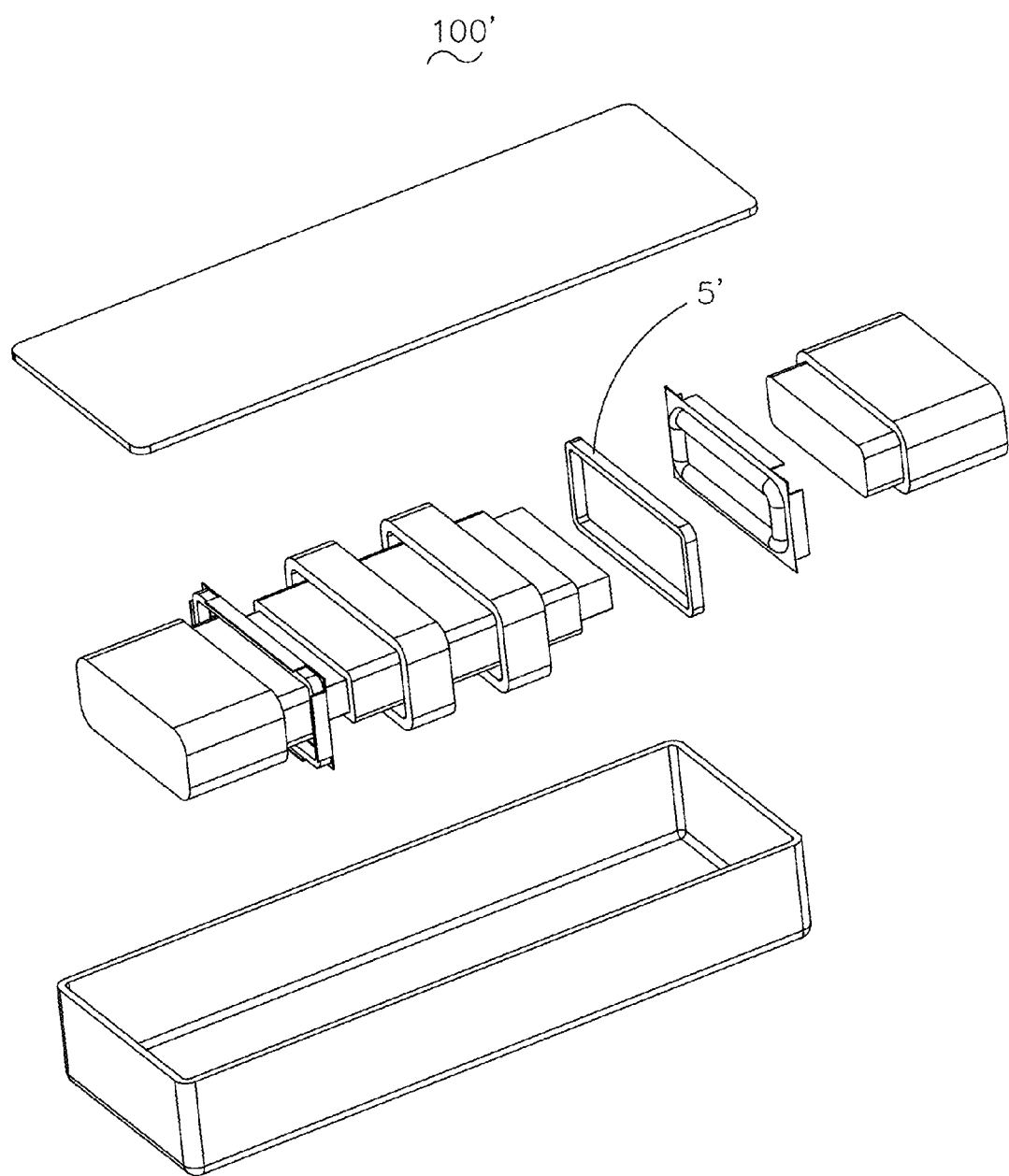
FIG. 6 is an exploded view of a linear vibrating motor according to another exemplary embodiment of the present disclosure.

Referring to FIG. 6, a linear vibrating motor according to a second exemplary embodiment of the present disclosure is shown. The linear vibrating motor 100' as provided in the second embodiment is similar to the above-described linear vibrating motor 100 as illustrated in FIGS. 1-3, but differs in that a connecting module 5' of the linear vibrating motor 100' has a rectangular ring-shaped structure.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrating motor, comprising:
a shell providing a receiving cavity;
a vibrating unit received in the receiving cavity and comprising a magnet module;
a coil module surrounding the magnet module for driving the vibrating unit to vibrate;
an elastic module comprising a pair of elastic members for suspending the vibrating unit;
wherein each of the elastic members comprises an elastic part for providing an elastic force to the vibrating unit in a vibrating direction thereof, and an elastic deforming capability of the elastic part in the vibration direction is greater than that in other directions; the vibrating unit further comprises a mass module, the mass module comprises a pair of mass members respectively located at two opposite sides of the magnet module; the elastic member further comprises a main plate surrounded by the elastic part, and the main plate is located between an corresponding end of the magnet module and a corresponding mass member.

2. The linear vibrating motor as described in claim 1, wherein the elastic part is an elastic protrusion protruding from edges of the main plate to the end of the magnet module.

3. The linear vibrating motor as described in claim 1, wherein the elastic part has a curved, V-shaped, or zigzagged cross-section.

4. The linear vibrating motor as described in claim 1, wherein the elastic member further comprises an extending periphery extending from the elastic part and coplanar with the main plate.

5. The linear vibrating motor as described in claim 4, wherein the elastic member further comprises a fixing part extending perpendicularly from the extending periphery and fixed to the shell.

6. The linear vibrating motor as described in claim 5, wherein the fixing part of the elastic member comprises four fixing plate perpendicularly connected four edges of the extending periphery respectively.

7. The linear vibrating motor as described in claim 6, further comprising a connecting module for connecting the elastic module with the shell, wherein the connecting module comprises a pair of connecting member, each of which corresponds to a respective elastic member of the elastic module.

8. The linear vibrating motor as described in claim 7, wherein each of the connecting members comprises four separate connecting bars, each of the connecting bars corresponds to a respective extending plate of the fixing part, and is located at a joint between the fixing part and the extending periphery.

9. The linear vibrating motor as described in claim 7, wherein each of the connecting members has a rectangular ring-shaped structure, and is located at a joint between the fixing part and the extending periphery.

* * * * *